Figure 1:
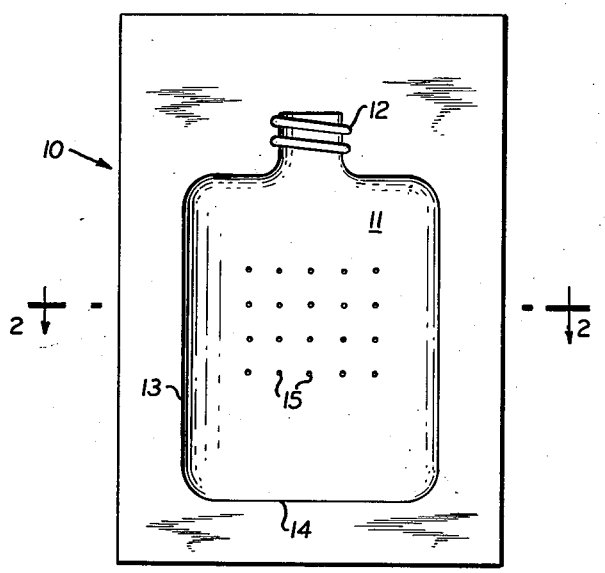

Jan. 15, 1963  J. H. DU BOIS  3,072,969
PROVISION OF SURFACE MARKINGS ON PLASTICS
Filed Nov. 18, 1959

INVENTOR
J. HARRY DUBOIS
BY
ATTORNEY.

United States Patent Office 3,072,969
Patented Jan. 15, 1963

3,072,969
PROVISION OF SURFACE MARKINGS
ON PLASTICS
John H. Du Bois, 29 Erwin Park Road, Montclair, N.J.
Filed Nov. 18, 1959, Ser. No. 853,949
7 Claims. (Cl. 18—55)

This invention relates to plastics molding techniques, more particularly to novel method for providing surface markings on thermoplastic materials formed by conventional molding processes.

The development of the plastics arts has resulted in the relatively widespread use of plastics for a variety of products and in many applications. Where plastics are employed in the packaging of goods, it is generally necessary to provide some sort of labeling for the packaging. In addition to labeling, it is also often desirable to provide any one of a variety of decorative surface markings to the molded plastics product.

In the formation of containers from plastics, thermoplastic polymers formed by blow molding techniques are generally employed. The resulting product is relatively light in weight, and though possessing sufficient rigidity to serve its container function, the product is relatively flexible as, for example, so called squeeze bottles. Any attempt to provide markings directly on the surface of relatively flexible articles of this type requires that some support be provided for the surface. Additional marking problems arise due to the relatively complex curves of the surfaces of these molded plastics. Attempts have been made to eliminate the aforementioned marking problems by utilizing conventional printing techniques to first apply the desired marking on flat sheets, which are subsequently bonded to the surface of the plastics product. These attempts have however been relatively unsuccessful, since where the printed sheet is applied to the surface of the plastics article after formation thereof, the handling required raises production costs. Attempts to bond the printed sheet to the product during the molding, as is necessary in order to minimize costs have proven unsuccessful since the sheets become distorted during their application to the plastics product. One of the primary causes of the difficulties is attributable to the fact that gas pockets form between the printed sheet and the formed plastics product in the mold. These gas pockets prevent intimate contact between the printed sheet and the surface to be marked resulting in either an irregularity in the markings or distortion of the surface.

It is with the above problems and desiderata in mind that the present method has been evolved, method permitting the application of surface markings to a molded thermoplastic product during the molding operation, with no surface irregularities on the marked surface. The novel method permits the use of conventional sheet marking techniques to provide desired markings on the fairly complex surfaces of blown plastics products, without incurring the costs of handling and processing, resulting from the application of printed labels after the plastic product is removed from the mold. It will be understood that the term "marking" as here employed will be taken to designate any surface indicia or texturing whether typographical or decorative, regardless of how formed.

It is accordingly a primary object of this invention to provide improved method for providing markings on the surface of a molded thermoplastic product.

Another object of the invention is to provide method for applying a premarked sheet to the surface of a molded thermoplastic product during the molding operation.

A further object of the invention is to provide method for applying a premarked sheet to the surface of a thermoplastic product without deformation of the sheet or the product surface.

It is also an object of this invention to provide method for providing distortion-free markings on the surface of molded thermoplastic products.

Another object of this invention is to provide a surface marking for plastics products with said marking being protected from defacement by subsequent handling of the product.

A further object of the invention is to provide improved method for bonding a sheet to a molded plastics product during the molding operation.

An additional object of the invention is to provide improved method for transferring markings from a marked sheet to the surface of a molded plastics product.

Another important object of the invention is to provide improved plastics molding techniques permitting the production of marked plastics products in an efficient economical manner.

These and other objects of the invention which will become hereafter apparent are achieved by providing a premarked matrix. This matrix is preferably in sheet form of a type to which printing, decorative overlay, or a texturing treatment may readily be applied. Additionally the matrix itself may be formed of a textured material. Some suitable matrix materials are paper, textile fabrics, thermoplastic polymer films such as polyethylene, metal in sheet or mesh form, and the like. The matrix is provided with gas passages extending from the surface of the matrix coming into contact with the molded plastic product to a point remote from this contacting surface. In practicing the invention, the matrix is held in position in the mold adjacent the parison during the molding operation and a vacuum is provided to draw any gases along the aforementioned passages during the molding operation. The matrix may either be bonded to the surface of the molded product during the molding operation, or the marking on the matrix may be transferred from the matrix to the molded product, with the matrix remaining separate. The vacuum employed to draw off the gases between the matrix and the parison may also be employed to hold the matrix in position and implements expansion of the parison in the mold.

An important feature of the invention resides in the fact that surface markings may be applied to molded plastic articles simultaneously with the molding of same without necessitating subsequent printing or surface treating operations.

A further feature of the invention resides in the fact that sheet material printed by conventional printing techniques may be applied to the molded article during molding without encountering the previous difficulties occasioned by the trapping of gas between the parison and the sheet material.

An additional feature of the invention resides in the fact that surface texturing may be provided on molded plastics during the molding operation by bringing the parison during molding into contact with a surface of desired texture to impress the texture on the parison without interference by the heretofore encountered air pockets.

Another feature of the invention permits the application of surface markings to a molded plastic article during molding by transference of the marking from a suitably inked surface to the parison.

A further feature of the invention resides in the fact that a single vacuum connection may be employed to maintain the matrix in position; draw off any gases; and aid in expanding the parison in the mold.

Figure 2:
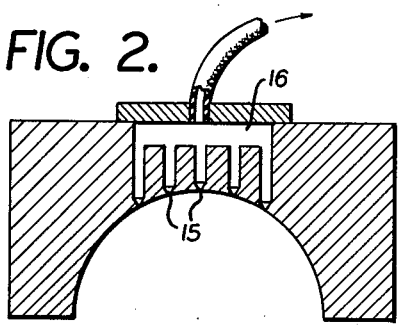
Figure 3:
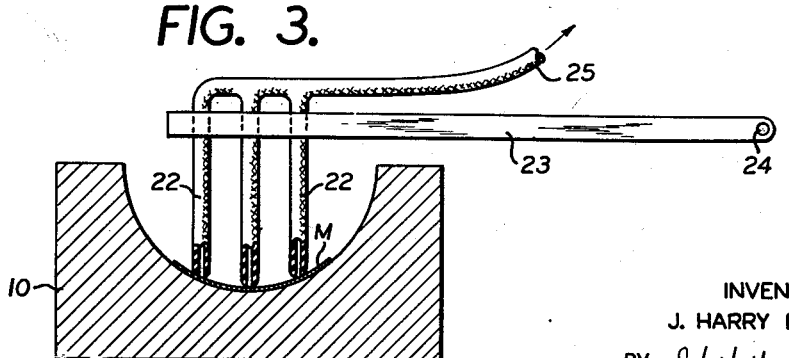

The specific details of the invention, and some modes of practicing same will be made most manifest and particularly pointed out in clear, concise and exact terms in conjunction with the accompanying drawings, wherein:

FIG. 1 is an elevational view of a blow mold half designed for forming a plastic bottle in accordance with the teachings of this invention; and FIG. 2 is a cross sectional view taken on line 2—2 of FIG. 1; and FIG. 3 is a schematic view showing how the matrix may be positioned within the mold.

Referring now more particularly to the drawing, like numerals in the various figures will be taken to designate like parts.

The drawings illustrate a mold suitable for the formation of a cylindrical plastics bottle. The mold 10 is formed in conventional fashion to contain a mold space 11 having a configuration like that of the article to be formed. In this case, the configuration is that of a cylindrical bottle having a threaded neck portion 12, a body portion 13 and a bottom 14. It will be apparent however to those skilled in the art that any other suitable shape may be employed.

In order to practice the teachings of the invention, a plurality of spaced air passages or ducts 15 are formed in the side walls of the mold-half adjacent the product surface on which the desired markings are to be applied. These ducts 15 extend to a header 16 connected in a suitable fashion to a pump capable of establishing a desired suction at the point of entry of ducts 15 into the mold space.

The schematic showing in FIG. 3 illustrates one suggested mode of inserting the matrix necessary for practicing the invention in mold 10. As seen in FIG. 3, the matrix M is maintained by suction fingers 22 supported on picker arm 23 and coupled to a suitable vacuum line 25 to provide the necessary suction at the tips of fingers 22. The picker arm 23 is shown as pivoted at pivot point 24, however it will be understood by those skilled in the art that the arm may be mounted in any suitable fashion so as to permit movement of the suction fingers 22 from a pick up point at which the matrices are stored to the delivery point in the mold adjacent ducts 15. The flexible nature of fingers 22 permits them to fit against the contour of the mold space in mold 10.

The matrix M may be formed in a variety of ways of a variety of materials depending on how it is to be used and the type of marking to be applied to the surface of the molded product. Where the matrix is to be bonded to the molded product it may be formed of a sheet-like thermoplastic resin with suitable melting point or a metal mesh or textile fabric coated with a resin of suitable melting point. It is preferred that the melting point of the resin be slightly lower than that of the molded product so that it will melt upon contact with the parison. Where the matrix is employed to provide a marking which is transferred from the matrix to the molded product, the marking may be of a texturing only or of indicia only or of a combination of texturing and indicia. To effect texturing the matrix is formed of a porous textured material not wettable by the resin employed in forming the plastics product such as textile fabrics, metal mesh, or coarse paper. The provision of indicia is accomplished by printing the matrix with either a non-thermosetting ink, or one subject to heat polymerization by passing through an infrared lamp area or the like. The only requirement necessary for any matrix employed whether of the type adapted for bonding to the molded plastics product, or of the type employed to transfer markings from the matrix surface to the molded product's surface is that the matrix be provided with air passages which extend from the portion of the matrix normally coming into contact with the expanding parison, and the ducts 15. These matrix passages are most efficiently provided by means of pores or perforations extending through the matrix. However it will be understood by those skilled in the art that channels may be formed on one surface of the matrix extending along the matrix surface to suitably positioned ducts in the mold.

*Operation*

It will of course be understood that any appropriate air handling system may be employed to provide the necessary vacuum at the duct entries.

Molds formed in accordance with the aforementioned teaching, and having the necessary ducts 15 arranged therein may be utilized to provide surface markings on molded thermoplastic materials in several ways. Thus surface markings may be applied either in the form of texturing of the surface of the molded plastics material; or in the form of decorative or typographical surface indicia applied to the surface of the plastics material; or as a label containing the desired markings applied to the surface of the plastics material. In all situations however the matrix must have gas passages extending from the surface coming into contact with the molded plastic product to a remote point.

Where texturing of the surface is desired, the matrix employed is formed of a textured material which will not be wetted by the molten plastic parison coming into contact therewith. Some suitable materials are paper, textile fabrics, silicon coated metal meshes, and the like. A sheet formed of this texturing material is arranged within the blow mold by utilizing picker arm 23 having pick up nozzles 22 permitting the matrix to be positioned in the mold. In connection with the application of texturing as the marking operation, it will of course be apparent to those skilled in the art that the textured matrix may be maintained in the mold for continuous use without requiring repositioning during each molding cycle. This is done by suitably securing the matrix over ducts 15 as shown in FIGS. 1 and 2.

The textured matrix is maintained in position in the mold by the action of the air stream through ducts 15. During the molding operation the relatively soft expanding parison contacts the matrix and the texturing of the matrix is impressed on the molded plastics product coming into contact therewith. After cooling the molded product is removed from the mold and the molding operation recommenced either with the same matrix or another.

The matrix makes uniform contact with the expanding parison thereadjacent since all gases which normally tend to accumulate between the matrix and the parison are removed via ducts 15. The vacuum produced by the flow of air through ducts 15 serves the threefold function of maintaining the matrix in position, drawing off gases from between the matrix and the parison, and helping to expand the parison in the mold.

In practicing the invention by transferring ink markings from the matrix to the molded plastics article, a plurality of matrices are provided having the desired markings imprinted thereon with an ink which will not set till after transfer to the parison. This may be ink of either a non-thermosetting or heat polymerizable type. The matrix itself is formed of a porous sheet material such as paper, textiles, metal mesh or the like, not wettable by the plastic. In operation, the loading arm is employed to position a matrix over ducts 15 in the mold 10, after which the parison is blown in the mold to form the desired plastics article. Upon contact of the surface of the plastics article with the matrix surface the ink markings on the matrix are transferred to the surface of the plastics article with the result that these transferred markings will be permanently set in the plastic upon curing, or the like treatment.

As noted, the invention may also be practiced by forming the matrix with the desired markings, and bonding the formed matrix to the molded plastics article. This is accomplished by printing the desired markings on a matrix material formed of sheet-like thermoplastic resin. Conventional printing techniques are employed in applying the desired markings to the resin matrices. The thermoplastic matrix is provided with air passages which may be obtained by employing a porous sheet material or forming a plurality of perforations, or a plurality of surface channels extending from the surface of the matrix, adapted to contact the molded article, to the ducts 15 of the mold. Apparatus such as the loading arm 23 are employed for positioning the resin matrix in the blow mold where it is held by the suction of ducts 15. The mold is closed, the parison blown, and the resin matrix heat softened by the incoming plastic is bonded to the expanding parison during the blowing operation so as to form an integral unit. Any gas which normally might tend to accumulate between the matrix and the blown parison is eliminated by the passage of gas through the ducts 15. Thus conventional printing techniques may be employed to apply the desired markings to the matrix, and the matrix may then be subsequently applied to the molded plastics article during the molding operation without necessitating any subsequent surface treatment of the article.

It is thus seen that novel means have been provided for the application of surface markings to thermoplastics material formed by conventional molding processes. The novel means permits the application of the markings to a simple sheet by employing the highly developed printing techniques available for applying markings to sheet materials, and subsequently incorporating the markings provided on the marked matrix in a molded plastics article without encountering the difficulties normally encountered in attempting to apply indicia to an irregular molded surface.

The above disclosure has been given by way of illustration and elucidation, and not by way of limitation, and it is desired to protect all embodiments of the herein disclosed inventive concept within the scope of the appended claims.

What is claimed is:

1. A method of applying surface markings to a blow molded plastic article during the molding of said article, said method comprising the steps of: forming the desired markings on a flat, relatively flexible porous sheet material matrix; positioning the matrix in the mold in which the article is to be formed; introducing the plastic parison into the mold; providing a vacuum on the side of the matrix remote from said parison; and molding the parison, whereby the surface of the expanding parison adjacent said matrix will have formed thereon the markings of said matrix free of any blemishes resulting from gas accumulations between the matrix and parison surface.

2. A method as in claim 1 in which the matrix is bonded to the expanding parison.

3. A method as in claim 1 in which the markings of the matrix are transferred to the surface of the plastic in the mold.

4. A method as in claim 3 in which said forming of the desired markings on the matrix is done by printing on the matrix with a non-thermosetting ink.

5. A method of labeling molded plastics products, said method comprising the steps of: printing the desired labeling on a perforate plastics film; loading the printed film into the mold employed for forming the plastics product; applying a vacuum to the film; and molding the plastics product in the mold, whereby the film will be bonded thereto with no gas pockets between the film and the molded product.

6. A method of labeling blow molded plastics products during molding, said method comprising the steps of: printing with a non-thermosetting ink the desired labeling on a porous sheet of material not wettable by the plastics to be labeled; loading the printed sheet into the mold employed for forming the plastics product; applying a vacuum to the sheet material; and molding the plastics product in the mold whereby the ink will be transferred from the sheet material to the surface of the molded plastics product.

7. A method of texturing the surface of a blow molded plastics product during molding, said method comprising the steps of: forming a porous sheet material with the desired texturing; loading the textured sheet into the mold employed for forming the plastics product; applying a vacuum to the sheet; and molding the plastics product, whereby upon expansion of the forming plastics product in the mold against the textured sheet, the texturing of the sheet will be applied to the product.

References Cited in the file of this patent

UNITED STATES PATENTS

| | | |
|---|---|---|
| 537,187 | Estabrook | Apr. 9, 1895 |
| 1,052,081 | Miltner | Feb. 4, 1913 |
| 1,557,748 | Washington | Oct. 20, 1925 |
| 1,592,536 | O'Neill | July 13, 1926 |
| 2,094,823 | Sample | Oct. 5, 1937 |
| 2,354,916 | Hurt | Aug. 1, 1944 |
| 2,523,234 | Rado | Sept. 19, 1950 |
| 2,601,700 | Pinsky et al. | July 1, 1952 |
| 2,632,202 | Haines | Mar. 24, 1953 |
| 2,696,642 | Kohrn | Dec. 14, 1954 |
| 2,790,994 | Cardot et al. | May 7, 1957 |
| 2,799,048 | Stirn et al. | July 16, 1957 |
| 2,975,476 | Burke | Mar. 21, 1961 |
| 2,976,571 | Moslo | Mar. 28, 1961 |

FOREIGN PATENTS

| | | |
|---|---|---|
| 1,126,402 | France | July 30, 1956 |
| 784,503 | Great Britain | Oct. 9, 1957 |